US012798032B2

(12) United States Patent
Shigekane et al.

(10) Patent No.: US 12,798,032 B2
(45) Date of Patent: Nov. 17, 2026

(54) MACHINE TOOL

(71) Applicant: DMG MORI CO., LTD., Nara (JP)

(72) Inventors: Akito Shigekane, Nara (JP); Junichi Kubota, Nara (JP); Hiroto Matsushita, Nara (JP)

(73) Assignee: DMG MORI CO., LTD., Nara (JP)

( * ) Notice: Subject to any disclaimer, the term of this patent is extended or adjusted under 35 U.S.C. 154(b) by 578 days.

(21) Appl. No.: 18/244,097

(22) Filed: Sep. 8, 2023

(65) Prior Publication Data

US 2023/0415292 A1 Dec. 28, 2023

Related U.S. Application Data

(63) Continuation of application No. PCT/JP2022/020138, filed on May 13, 2022.

(30) Foreign Application Priority Data

Jun. 7, 2021 (JP) ................................ 2021-094983

(51) Int. Cl.
*B23Q 17/00* (2006.01)
*B23Q 17/24* (2006.01)

(52) U.S. Cl.
CPC ................................ *B23Q 17/2409* (2013.01)

(58) Field of Classification Search
CPC .......... B23Q 17/2409; B23Q 2717/003; B23Q 17/2404; B23Q 17/2457; B23Q 17/2461; B23Q 17/249
See application file for complete search history.

(56) References Cited

U.S. PATENT DOCUMENTS 4,809,748 A * 3/1989 Robins ................ F16K 11/0743 251/129.13
6,091,453 A * 7/2000 Coan ...................... H04N 23/50 348/E5.025
6,170,980 B1 * 1/2001 Martin .................. G01N 13/00 366/144
6,174,497 B1 * 1/2001 Roinestad .......... G01N 21/8507 366/144
6,535,796 B1 * 3/2003 Sierro .................... G01N 11/14 700/285
7,131,136 B2 * 10/2006 Monroe ................ H04N 7/181 348/E7.086

(Continued)

FOREIGN PATENT DOCUMENTS

CA 3 137 237 A1 12/2020
DE 10 2017 109 360 A1 11/2017

(Continued)

*Primary Examiner* — Frank F Huang
(74) *Attorney, Agent, or Firm* — IP Business Solutions, LLC

(57) ABSTRACT

A machine tool includes a headstock for supporting a workpiece spindle to allow the workpiece spindle to rotate and a camera for imaging a tool held in a predetermined area. The camera is fixed to the headstock above the workpiece spindle with an optical axis of the camera inclined with respect to a vertical direction. The machine tool may further include an illumination unit arranged to face the camera. In this case, the area is formed between the camera and the illumination unit. The camera is arranged to be closer to the headstock than the illumination unit is.

5 Claims, 9 Drawing Sheets

(56) References Cited

U.S. PATENT DOCUMENTS

| | | | | |
|---|---|---|---|---|
| 7,266,420 | B2 * | 9/2007 | Budd | G01B 11/2433 700/95 |
| 8,031,264 | B2 * | 10/2011 | Iwamura | H04N 7/181 348/373 |
| 8,525,877 | B2 * | 9/2013 | Lortie | E03F 7/12 348/82 |
| 9,751,181 | B2 * | 9/2017 | Yamamoto | B23Q 17/2233 |
| 9,841,748 | B2 * | 12/2017 | Kim | G05B 19/401 |
| 2001/0037509 | A1 * | 11/2001 | Kligman | H04N 7/181 348/E7.086 |
| 2003/0081121 | A1 * | 5/2003 | Kirmuss | B60R 11/02 348/E7.086 |
| 2003/0149816 | A1 * | 8/2003 | Poo | H04N 1/00236 710/62 |
| 2004/0038169 | A1 * | 2/2004 | Mandelkern | A61B 1/24 433/29 |
| 2004/0145676 | A1 * | 7/2004 | Lin | H04N 1/00204 348/E5.025 |
| 2005/0003550 | A1 * | 1/2005 | Kyne | G01N 33/15 422/68.1 |
| 2006/0159164 | A1 * | 7/2006 | Finizio | B64D 45/0053 348/E7.086 |
| 2008/0036863 | A1 * | 2/2008 | Esbensen | G08B 13/19667 348/E7.086 |
| 2008/0058029 | A1 * | 3/2008 | Sato | G06K 19/0723 455/573 |
| 2008/0129822 | A1 * | 6/2008 | Clapp | H04N 5/77 386/E5.069 |
| 2008/0297587 | A1 * | 12/2008 | Kurtz | G06V 40/20 348/E7.083 |
| 2009/0256908 | A1 * | 10/2009 | Chen | G08B 13/19641 348/143 |
| 2009/0265946 | A1 * | 10/2009 | Jordil | G01B 7/012 290/1 R |
| 2010/0130054 | A1 * | 5/2010 | Le | H01B 7/0838 439/502 |
| 2010/0141957 | A1 * | 6/2010 | Hou | G01B 9/02007 356/487 |
| 2010/0198009 | A1 * | 8/2010 | Farr | A61B 90/53 600/109 |
| 2010/0288088 | A1 * | 11/2010 | Miyamoto | B23Q 1/76 82/1.11 |
| 2010/0288089 | A1 * | 11/2010 | Miyamoto | B23Q 1/76 29/27 R |
| 2011/0099095 | A1 * | 4/2011 | Moore | G06Q 30/04 705/400 |
| 2011/0144517 | A1 * | 6/2011 | Cervantes | A61B 5/08 600/538 |
| 2011/0189936 | A1 * | 8/2011 | Haspers | H05K 7/1497 211/26 |
| 2011/0211069 | A1 * | 9/2011 | Sybesma | H04N 7/185 348/143 |
| 2011/0234807 | A1 * | 9/2011 | Jones | H04N 23/698 348/E7.085 |
| 2012/0075465 | A1 * | 3/2012 | Wengrovitz | H04N 7/181 348/143 |
| 2012/0086802 | A1 * | 4/2012 | Eng | A01K 61/95 348/135 |
| 2012/0281095 | A1 * | 11/2012 | Trenciansky | H04N 7/18 348/143 |
| 2013/0019124 | A1 * | 1/2013 | Grimshaw | G06F 11/2015 714/24 |
| 2013/0061624 | A1 * | 3/2013 | Zwinkels | H05K 7/1497 312/223.1 |
| 2013/0077083 | A1 * | 3/2013 | Suzuki | G02B 27/0031 359/226.1 |
| 2013/0278751 | A1 * | 10/2013 | Kranitzky | G06T 7/75 348/94 |
| 2016/0091779 | A1 * | 3/2016 | Jodoin | G03B 17/563 396/428 |
| 2016/0134737 | A1 * | 5/2016 | Pulletikurty | G06F 3/0485 715/735 |
| 2017/0001577 | A1 * | 1/2017 | Seagraves | B60R 11/04 |
| 2017/0326700 | A1 | 11/2017 | Morimura | |
| 2021/0016407 | A1 | 1/2021 | Jacot et al. | |
| 2021/0402483 | A1 * | 12/2021 | Noguchi | B23B 13/024 |
| 2022/0250201 | A1 | 8/2022 | Jacot et al. | |
| 2023/0415289 | A1 * | 12/2023 | Matsushita | B23Q 11/00 |
| 2023/0415292 | A1 * | 12/2023 | Shigekane | B23Q 17/2409 |

FOREIGN PATENT DOCUMENTS

| | | | |
|---|---|---|---|
| JP | 2001-277077 | A | 10/2001 |
| JP | 2007-196327 | A | 8/2007 |
| JP | 2011-041985 | A | 3/2011 |
| JP | 2012-125901 | A | 7/2012 |
| JP | 2012-213840 | A | 11/2012 |
| JP | 2013-202720 | A | 10/2013 |
| JP | 2015-131357 | A | 7/2015 |
| JP | 2021-507820 | A | 2/2021 |

* cited by examiner

110

MACHINE TOOL

BACKGROUND OF INVENTION

1. Field

The present invention relates to a technology for testing tools of a machine tool.

2. Description of Related Art

Examples of machine tools include a turning center that moves a tool relative to a rotating workpiece, a machining center that moves a rotating tool relative to a workpiece, and a combined machine having combined functions of a turning center and a machining center. Tools are fixed to a tool holding part such as a tool spindle or a blade rest. A machine tool machines a workpiece by changing tools and moving the tool holding part in accordance with a machining program provided in advance.

In such a machine tool, if a tool has an abnormality, such as a fracture or a breakage, or abrasion of a tool exceeds an acceptable level, the tool (hereinafter also referred to as a "faulty tool") cannot be used. Thus, a technology for imaging a blade shape of a tool by a camera and testing whether or not the tool is a faulty tool on the basis of the images before use has been proposed (Patent Literature 1).

A tool test is generally performed on the basis of taken images of the tool being illuminated by an illumination device. Arrangement of the camera and the illumination device on sides of a tool opposite each other enables the camera to obtain a high-contrast image in which the outline position of the tool is easily viewable. Specifically, the outline of a tool is extracted from differences in the contrast between the tool and the background to generate tool shape data. Whether or not the tool is a faulty tool can be determined on the basis of the resultant tool shape.

Related Art List

Patent Literature 1: JP 2015-131357 A

By the way, a camera and an illumination device for tool test are generally supported by a long arm, and a positional relation between them is adjusted. For example, the proximal end of the arm is fixed to a headstock that supports a workpiece spindle, and the camera is fixed to the distal end of the arm. The illumination device is fixed to the proximal end of the arm or to another arm. A test area is provided between the camera and the illumination device. In tool test, a tool spindle is moved so as to place a tool in the test area.

However, the headstock is provided with a motor for rotating the workpiece spindle, and the temperature of the headstock may become high because of the motor serving as a heat source. The arm may extend (expand) due to conduction of heat from the headstock, to cause deviation in the positional relation between the camera and the tool. Further, the position of the camera may become unstable because of disturbance, such as vibration of the workpiece spindle. This positional deviation may reduce the test accuracy.

SUMMARY

A machine tool according to an aspect of the present invention includes: a headstock for supporting a workpiece spindle to allow the workpiece spindle to rotate; and a camera for imaging a tool held in a predetermined area. The camera is fixed to the headstock above the workpiece spindle with an optical axis of the camera inclined with respect to a vertical direction.

A machine tool according to another aspect of the present invention includes: a headstock for supporting a workpiece spindle to allow the workpiece spindle to rotate; a camera for imaging a tool held in a predetermined area; and an illumination unit arranged to face the camera. The area is formed between the camera and the illumination unit. The camera is arranged to be closer to the headstock than the illumination unit is.

The present invention relates to imaging for recognizing a tool state, and misalignment of a camera caused by conduction of heat, vibration, or the like can be prevented according to the present invention.

DETAILED DESCRIPTION

An embodiment of the present invention will be described below with reference to the drawings.

Figure 1:
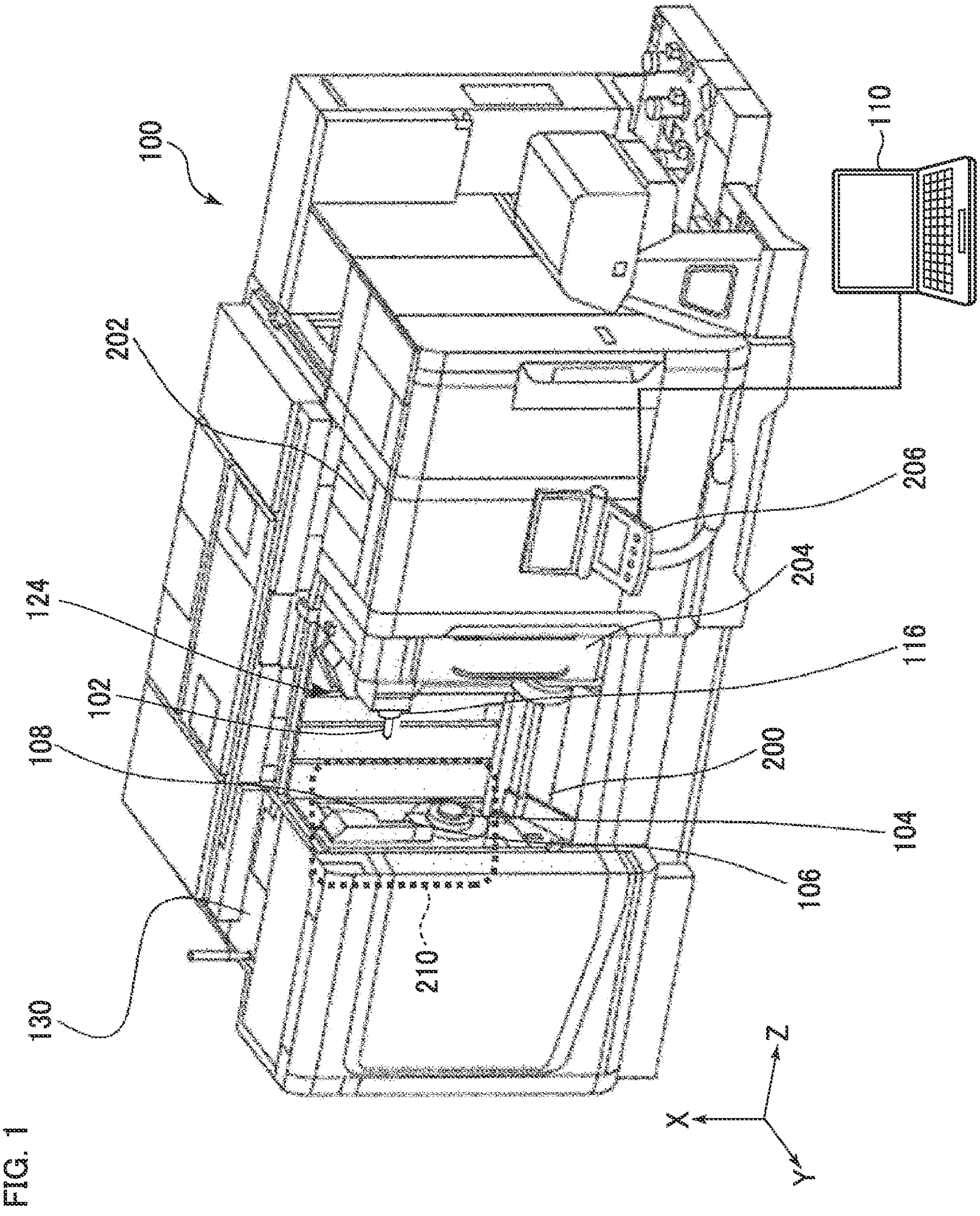
FIG. 1 is a perspective view illustrating the appearance of a machine tool according to the embodiment.

FIG. 1 is a perspective view illustrating the appearance of a machine tool according to the embodiment.

A machine tool 100 is configured as a combined machine that machines a workpiece into a desired shape while performing tool change as necessary. In the following description, the up-down direction, the front-rear direction, and the left-right direction when the machine tool 100 is viewed from the front are respectively referred to as the X-axis direction, the Y-axis direction, and the Z-axis direction for the sake of convenience.

The machine tool 100 includes machining equipment 124 that machines a workpiece with a tool and a tool storage 130 that stores therein a plurality of tools as objects of tool change. The machining equipment 124 machines a workpiece arranged in a machining area 200. The workpiece is fixed to a workpiece spindle 104 and is cut by a tool 102 attached to a tool spindle 116. The tool spindle 116 functions as a "tool holding part". The workpiece spindle 104 is rotationally driven by a driving mechanism.

A tool recognition area 210 is provided between the tool storage 130 and the machining area 200. In the tool recognition area 210, a camera 106 and an illumination device 108 that are used for tool test are installed. The illumination device 108 functions as an "illumination unit". When the tool 102 is inserted into the tool recognition area 210, the illumination device 108 located thereabove illuminates the tool 102, and the camera 106 located therebelow takes an image of the tool 102. Tool registration and tool test, which will be described later, are performed on the basis of the taken image. A configuration of the tool recognition area 210 will be described later in more detail in connection with FIG. 2.

The machine tool 100 includes a cover 202 that blocks the exterior. The cover 202 has a door 204. A user opens the door 204 to mount a workpiece and to take out the workpiece. An operation panel 206 accepts various operations to the machine tool 100 from an operator.

The operation panel 206 is connected to an image processing device 110. The operator can remotely monitor the work status of the machine tool 100 with the image processing device 110. In the present embodiment, the main unit of the machine tool 100 and the image processing device 110 are connected with each other via a cable. The image processing device 110 may be included in the machine tool 100, as an internal device of the operation panel 206, for example.

The operation panel 206 may be formed as a part of the machine tool 100 or be configured to be detachable from the machine tool 100 and transportable.

A tool storage 130 stores a plurality of tools 102. A tool 102 is selected from the plurality of tools 102 stored in the tool storage 130 by a tool change unit (described later) and attached to the tool spindle 116.

Figure 2:
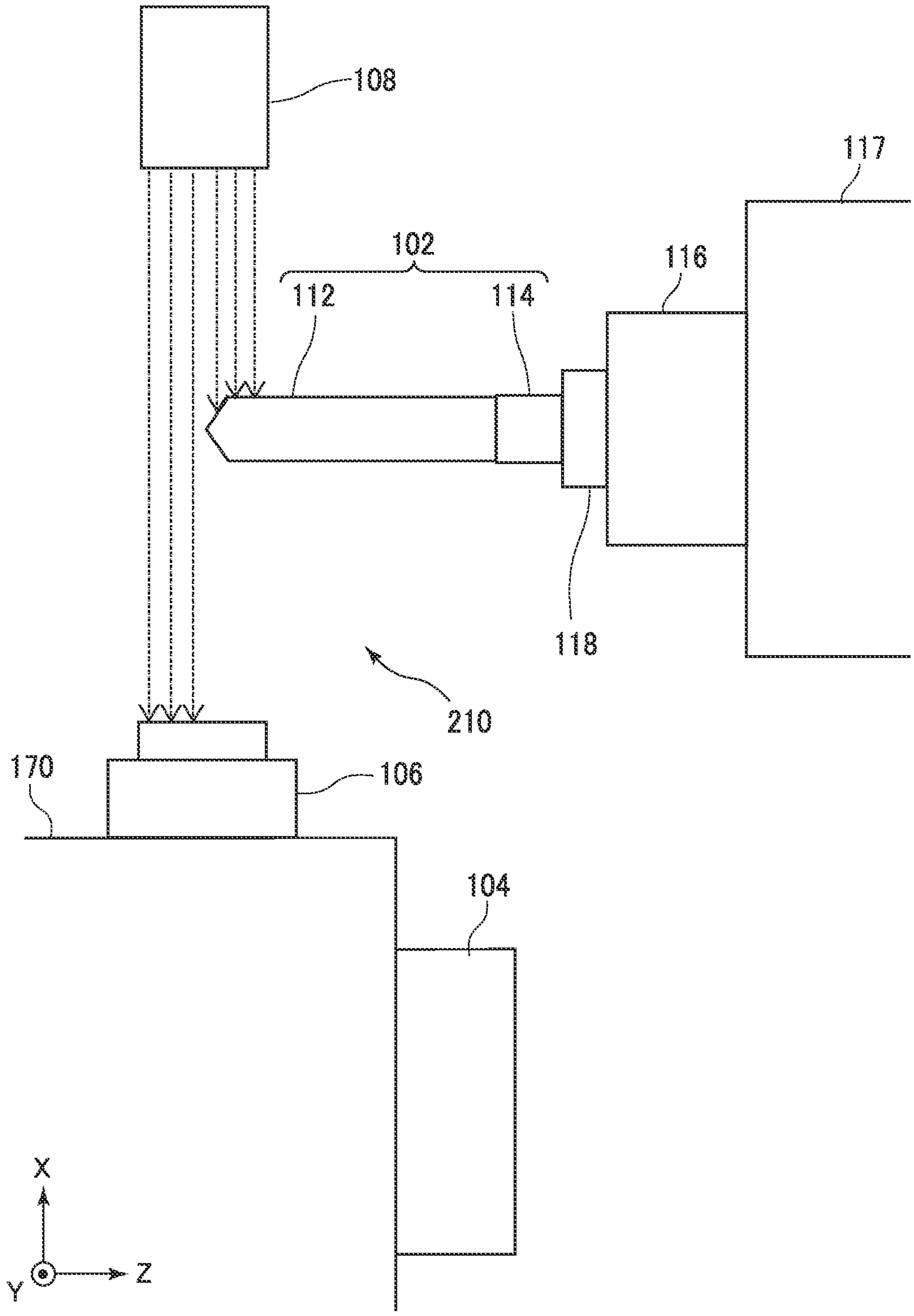
FIG. 2 is a schematic diagram illustrating a positional relation among a tool, a camera, and an illumination device in a tool recognition area.

FIG. 2 is a schematic diagram illustrating a positional relation among the tool 102, the camera 106, and the illumination device 108 in the tool recognition area 210.

The tool 102 includes a blade part 112 to be used for machining of a workpiece, and a shank part 114 to be fixed to a holder 118 of the tool spindle 116. The tool spindle 116 is supported by a spindle head 117 to be rotatable about an axis. The spindle head 117 is provided with a spindle motor for driving and rotating the tool spindle 116. The machine tool 100 is provided with a moving mechanism (not illustrated) for moving the spindle head 117 in three axial directions (the X-, Y-, and Z-axis directions). This moving mechanism includes a screw feed mechanism for moving the spindle head 117 and a servo motor that drives the screw feed mechanism. The tool 102 is moved together with the spindle head 117 in the three axis directions and rotated together with the tool spindle 116.

The camera 106 includes an image sensor (image pickup element) such as a complementary metal oxide semiconductor (CMOS) or charge-coupled device (CCD). The camera 106 takes images of the tool 102 attached to the tool spindle 116 from below. The camera 106 is connected to the image processing device 110, and a taken image is transmitted to the image processing device 110. By rotating the tool 102, images of the tool 102 can be taken from a plurality of directions. Further, by moving the tool 102 in the horizontal direction (in the Y- and Z-directions), images of a plurality of parts of the tool 102 can be taken.

The illumination device 108 is arranged to face the camera 106. The illumination device 108 illuminates the tool 102 from above. Transmitted illumination by the illumination device 108 enables the camera 106 to take a high-contrast image in which the outline position of the tool 102 is easily viewable.

When newly registering the tool 102 (this process will be referred to "tool registration"), a user sets a tool registration mode on the operation panel 206 and attaches a new tool 102 to the tool spindle 116. The user then inputs a freely-selected tool ID. The tool spindle 116 moves and rotates the tool 102, and the fixed camera 106 automatically takes images of the tool 102 from various positions and directions. The tool shape is recognized from many images taken by the camera 106, and the tool ID and the tool shape are registered in association with each other. With this control method, the tool shape can be automatically registered for each tool 102 in association with the tool ID. The tool shape is created as two-dimensional data or three-dimensional data.

The tool spindle 116 causes the tool 102 to enter the tool recognition area 210, also when tool test is performed on the tool 102 before or after being used in a machining work. Similarly at the time of new registration, the tool spindle 116 moves and rotates the tool 102, and the camera 106 automatically takes images of the tool 102 from various positions and directions. The tool shape is recognized from many images taken by the camera 106. Test performed on the tool 102 is hereinafter referred to as "tool test".

An operator compares the tool shape data at the time of tool registration and the tool shape data at the time of tool test with each other, thereby determining the degree of abrasion of the tool 102 and whether a fracture is present. For example, although the tool length as the catalog specification is 170.000 millimeters, the measurement value of the tool length at the time of tool registration may be 170.008 millimeters. In this case, the degree of abrasion of the tool 102 is determined on the basis of 170.008 millimeters that is the tool length at the time of registration as a reference.

The camera 106 in the present embodiment has a resolution of about five million pixels (2448×2048). The imaging range is about 17 millimeters×14 millimeters. More specifically, the imaging range may be 16.8 millimeters×14.0 millimeters. In addition, the camera 106 can take a maximum of 20 images per second.

The tool storage 130 is located at the back (on the Z-axis negative direction side) of the tool recognition area 210 when viewed from the tool spindle 116 side (see FIG. 1). In tool change, the tool spindle 116 enters the tool recognition area 210 deeply and is subjected to tool change in the tool storage 130. Meanwhile, in tool registration and tool test, the tool spindle 116 enters the tool recognition area 210 relatively shallowly.

Next, a configuration for tool test is described in detail.

Figure 3:
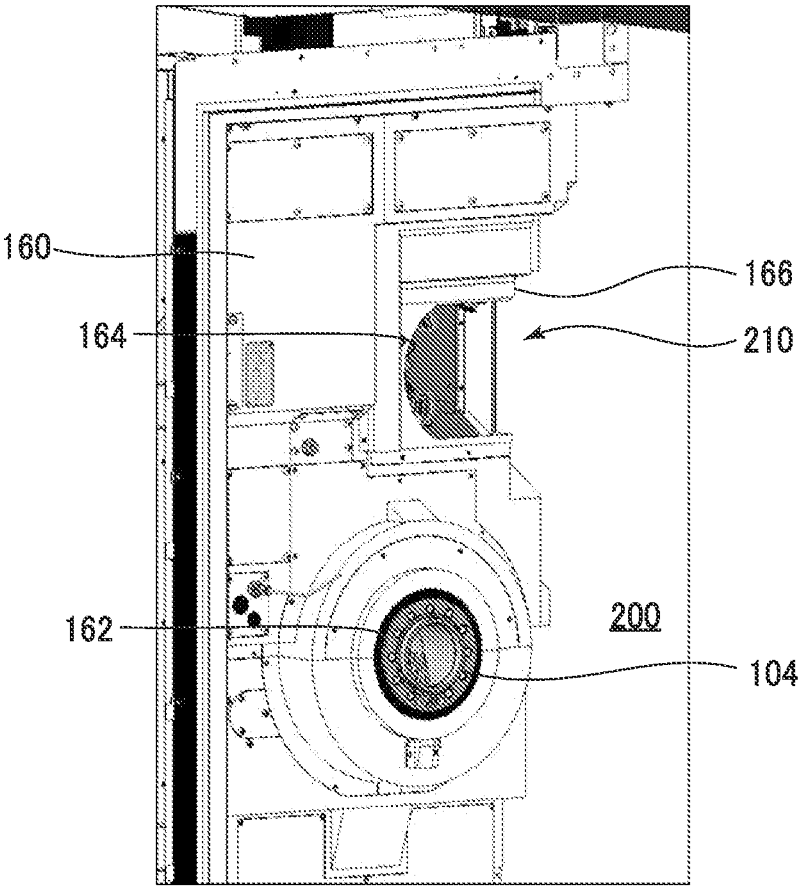
FIG. 3 is a perspective view of the tool recognition area and its surroundings.

FIG. 3 is a perspective view of the tool recognition area 210 and its surroundings.

An inner cover 160 is provided as a partition between the machining equipment 124 and the tool storage 130. An opening 162 for exposing the workpiece spindle 104 is formed in the inner cover 160. Further, an opening 164 is formed at a predetermined position of the inner cover 160, and a shutter 166 is provided to open and close the opening 164. The tool recognition area 210 (that is a space) is formed at the back of the shutter 166 when viewed from the machining area 200 side, and above the workpiece spindle 104. As described above, the camera 106 and the illumination device 108 are arranged in the tool recognition area 210. The machining area 200 leads to the tool storage 130 (FIG. 1) through the tool recognition area 210.

The shutter 166 is a movable partition plate that opens and closes the tool recognition area 210 with respect to the machining area 200. The shutter 166 is driven to be opened and closed by a driving mechanism including a servo motor (not illustrated). During machining of a workpiece, the tool recognition area 210 is closed by the shutter 166. A coolant that is a cooling liquid for removing frictional heat produced between the workpiece and the tool 102 is injected in the machining area 200 during machining. Swarf of the workpiece also scatters in the machining area 200. Therefore, by closing the tool recognition area 210 with the shutter 166, entrance of the coolant and the like into the tool recognition area 210 is prevented.

When tool test is instructed by a measurement command or the like, the machine tool 100 stops machining of the workpiece. At this time, the machine tool 100 stops also the injection of the coolant. The machine tool 100 then moves the tool 102 to a predetermined position (hereinafter, a "standby position") in front of the tool recognition region 210 and causes the tool 102 to rotate at the standby position at high speed. By the high-speed rotation of the tool 102, the coolant and the swarf adhering to the tool 102 (hereinafter, collectively "adhering matters") are spun off. Hereinafter, the high-speed rotation of the tool 102 performed in order to remove the adhering matters at the standby position is referred to as "cleaning rotation".

After the cleaning rotation, the shutter 166 opens, and the tool 102 is caused to enter the tool recognition area 210. The tool 102 inserted into the tool recognition area 210 is imaged by the camera 106, whereby tool test is performed.

As described above, the machining area 200 leads to the tool storage 130 through the tool recognition area 210. Therefore, when tool change is performed, the tool 102 is inserted deeply into the tool recognition area 210. Not only in tool test but also in tool change, the tool 102 passes through the tool recognition area 210. Therefore, cleaning rotation may be performed similarly also before passing of the tool 102.

Figure 4:
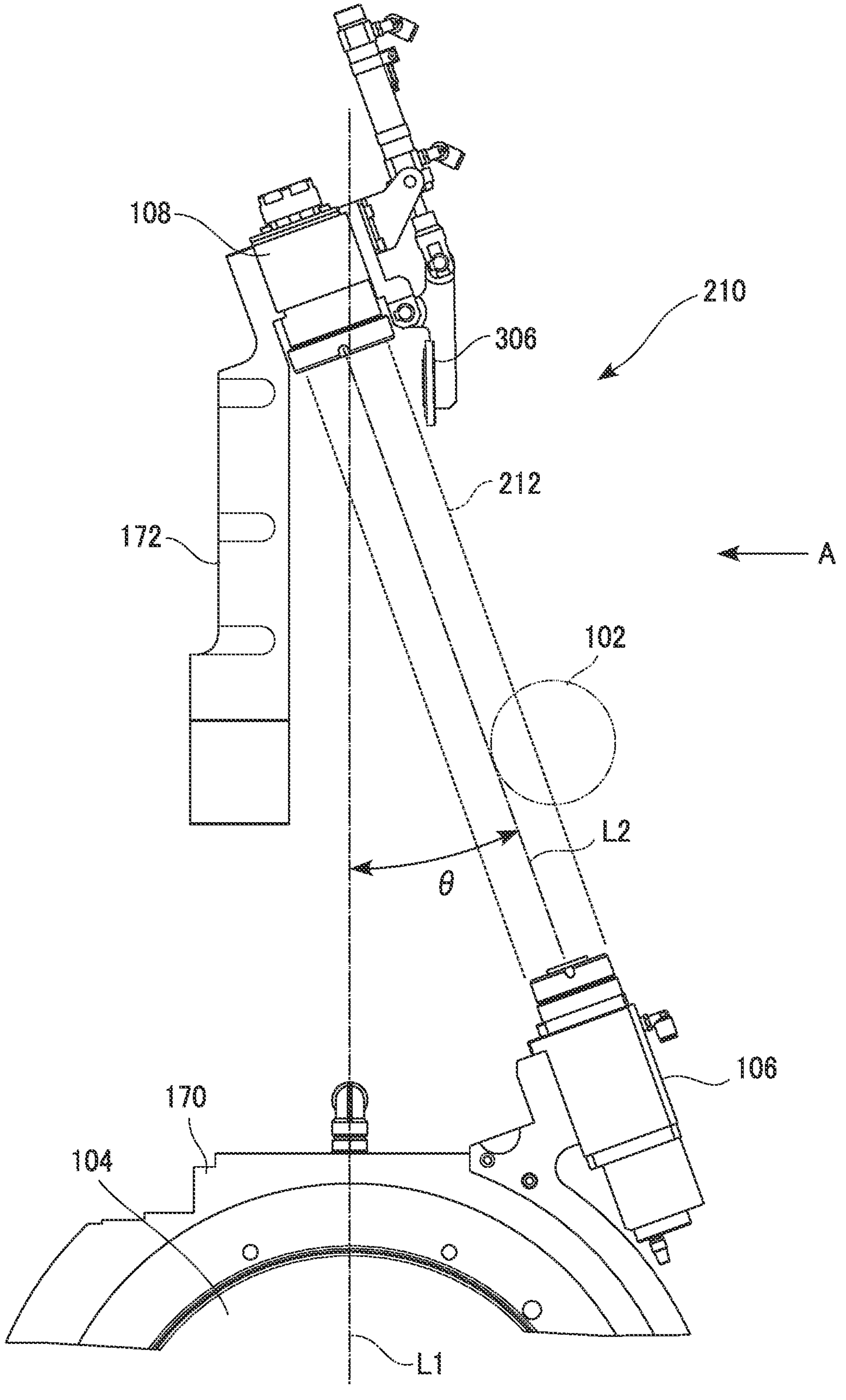
FIG. 4 is a diagram illustrating a main configuration for tool test.
Figure 5:
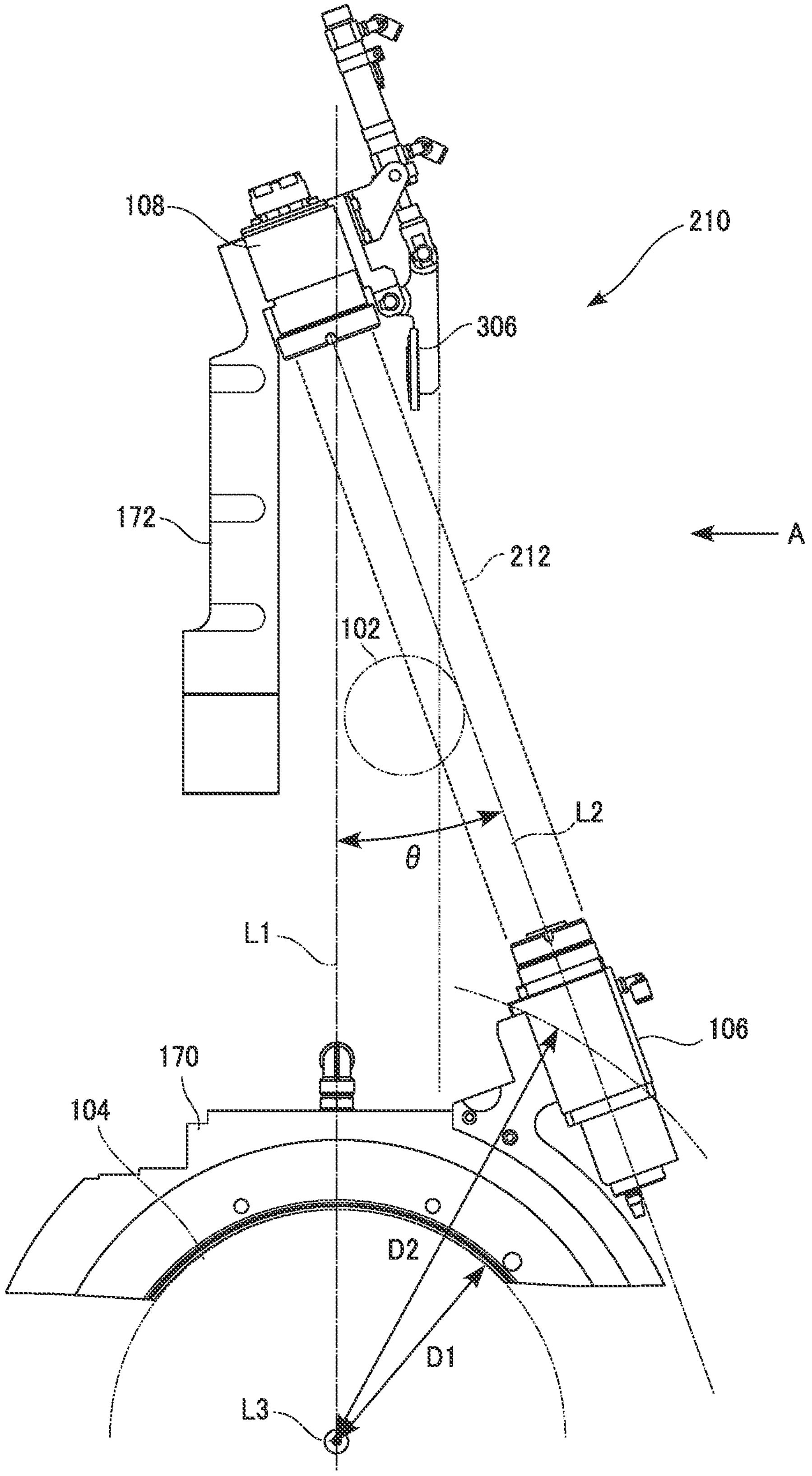
FIG. 5 is a diagram illustrating the main configuration for tool test.
Figure 6:
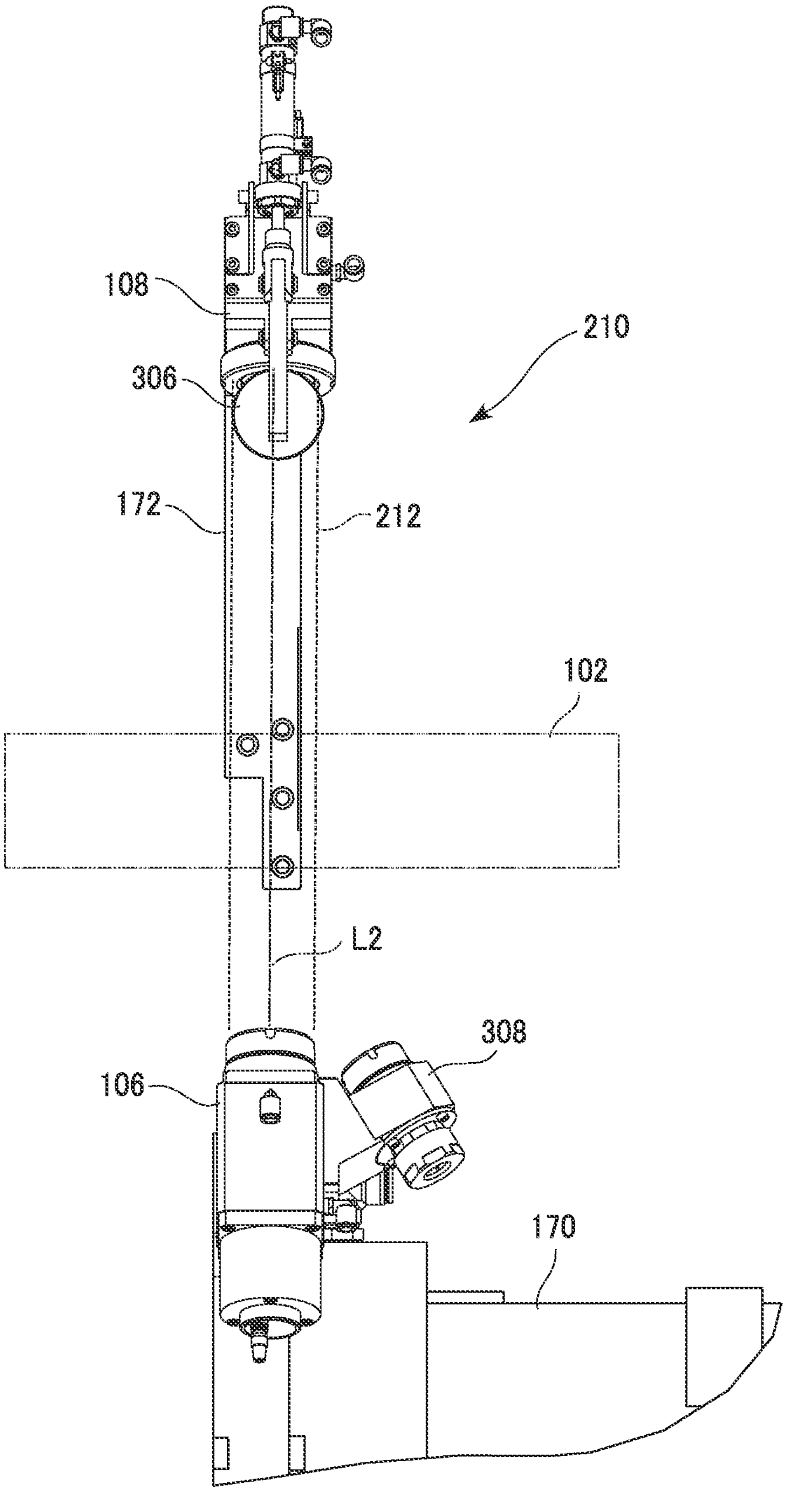
FIG. 6 is a diagram illustrating the main configuration for tool test.
Figure 7:
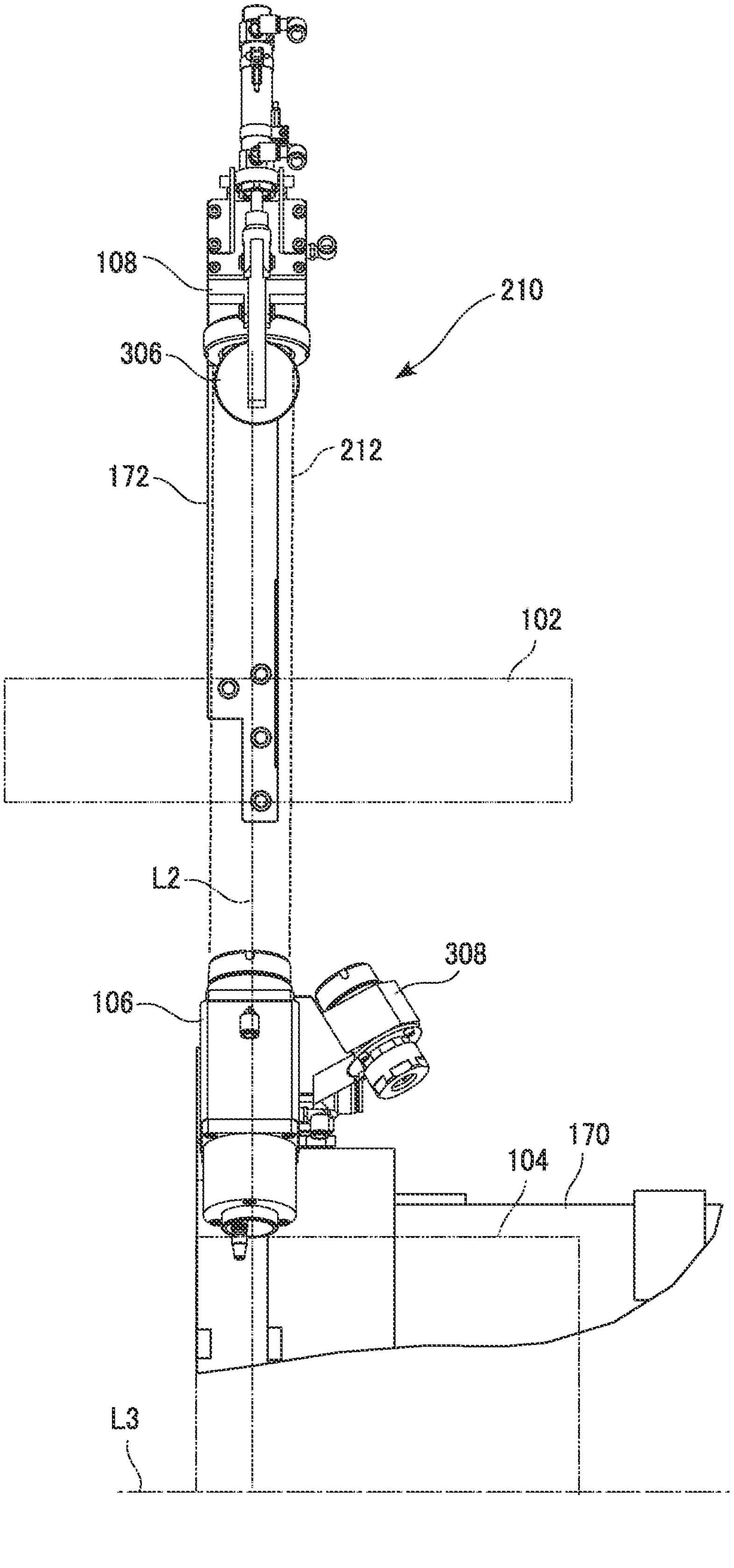
FIG. 7 is a diagram illustrating the main configuration for tool test.

FIGS. 4 to 7 are diagrams illustrating a main configuration for tool test. FIGS. 4 and 5 illustrate the tool recognition area 210 when viewed from the machining area 200 side (viewed in the axial direction of the workpiece spindle 104), with the inner cover 160 removed. FIGS. 6 and 7 illustrate the tool recognition area 210 when viewed in the direction A in FIG. 4 (viewed in a direction perpendicular to the axis of the workpiece spindle 104). A portion surrounded by a long-dashed double-dotted line in the drawings schematically illustrates the tool 102 held in the tool recognition area 210 for tool test.

As illustrated in FIG. 4, the workpiece spindle 104 is supported by a headstock 170 to be rotatable, and the camera 106 is fixed to the headstock 170. Meanwhile, the illumination device 108 is fixed to an arm 172 provided above the headstock 170. In more detail, the camera 106 is fixed to the headstock 170 at a position offset from a vertical line L1 crossing the rotation axis of the workpiece spindle 104 (that is, the axis of the workpiece spindle 104).

Meanwhile, the arm 172 is fixed to the housing of the tool storage 130 at its proximal end (its lower end) and protrudes to above the headstock 170. The illumination device 108 is fixed to the distal end (the upper end) of the arm 172 and located on the vertical line L1. The camera 106 is arranged with its light-receiving surface facing diagonally upward, and its optical axis L2 is inclined at a predetermined angle (an inclination angle θ) with respect to the vertical line L1. The illumination device 108 is arranged in such a manner that its light-emitting surface is on the optical axis L2 and faces diagonally downward. A predetermined area, that is, a test area 212 is formed between the camera 106 and the illumination device 108 in the tool recognition area 210. In tool test, an imaging target part (a part to be imaged for test) in the tool 102 is arranged in the test area 212.

Not all liquids, such as a coolant and a cleaning solution, adhering to the surface of the tool 102 can be removed by the above-described cleaning rotation. The inclination angle θ is set in such a manner that, even when a small amount of the coolant left or the like drops, the camera 106 (in particular, the light-receiving surface) below the tool 102 cannot be contaminated. Thus, the camera 106 is offset from a position directly below the tool 102. Although the inclination angle θ is set to 20 degrees in the present embodiment, it can be set between 15 degrees and 90 degrees, inclusive as appropriate. The inclination angle θ may be set between 15 degrees and 45 degrees, inclusive. However, it is preferable to set the inclination angle θ to about 20 degrees, considering that the camera 106 is directly attached to the headstock 170 as illustrated in the drawings in the present embodiment and also considering effective utilization of the space in the machine tool 100.

In more detail, a cover 306 is installed next to the illumination device 108 to cover the light-emitting surface of the illumination device 108, as illustrated also in FIG. 5. A cover for covering the light-receiving surface of the camera 106 may be installed next to the camera 106, although not illustrated. The optical axis L2 is inclined in such a manner that the illumination device 108 and the cover 306 do not overlap the camera 106 when viewed along the vertical line L1 (or viewed from above on the vertical line L1) (see the long-dashed double-dotted line parallel to the vertical line L1 in FIG. 5).

The camera 106 is thus offset from the position directly below the tool 102. Consequently, even when a coolant or the like drops from the tool 102 inserted into the tool recognition area 210, the coolant or the like can be prevented from adhering to the camera 106 or the cover thereof, so that contamination of the camera 106 can be prevented.

Further, inclining the optical axis L2 moves the tool 102 to a position apart from the arm 172 to which the illumination device 108 is fixed. Therefore, imaging of the tool 102 having a large tool diameter also becomes possible.

As illustrated in FIG. 5, assuming that a distance from an axis L3 of the workpiece spindle 104 to the outer peripheral end of the workpiece spindle 104 (that is, the radius of the workpiece spindle 104) is D1, an arrangement is employed in which the whole or a part of the camera 106 is included within a distance D2 (corresponding to the diameter of the workpiece spindle 104) that is twice the distance D1 from the axis L3 when viewed along the axis L3 of the workpiece spindle 104.

As illustrated also in FIG. 6, the tool 102 is inserted between the camera 106 and the illumination device 108. A sub-illumination device 308 for illuminating the tool 102 from below is also installed to the side of the camera 106. The covers for the camera 106 and the illumination device 108 are each driven to rotate about a rotation axis extending in the Z-axis direction, and open or close the light-receiving surface and the light-emitting surface, respectively. Detailed descriptions of the covers are omitted.

In tool test, the tool 102 is imaged by the camera 106 in a state where the tool 102 is illuminated from above by the illumination device 108. In tool change, the tool 102 enters the tool recognition area 210 more deeply than in tool test.

In the present embodiment, the camera 106 itself is provided with a ring light. As also illustrated in FIG. 7, the optical axis L2 of the camera 106 overlaps the workpiece spindle 104 when viewed in a direction perpendicular to the axis L3 of the workpiece spindle 104 (in the direction A in FIG. 5). Meanwhile, when viewed in the direction of the axis L3 of the workpiece spindle 104, the optical axis L2 of the camera 106 does not overlap the workpiece spindle 104, as illustrated in FIG. 5.

Figure 8:
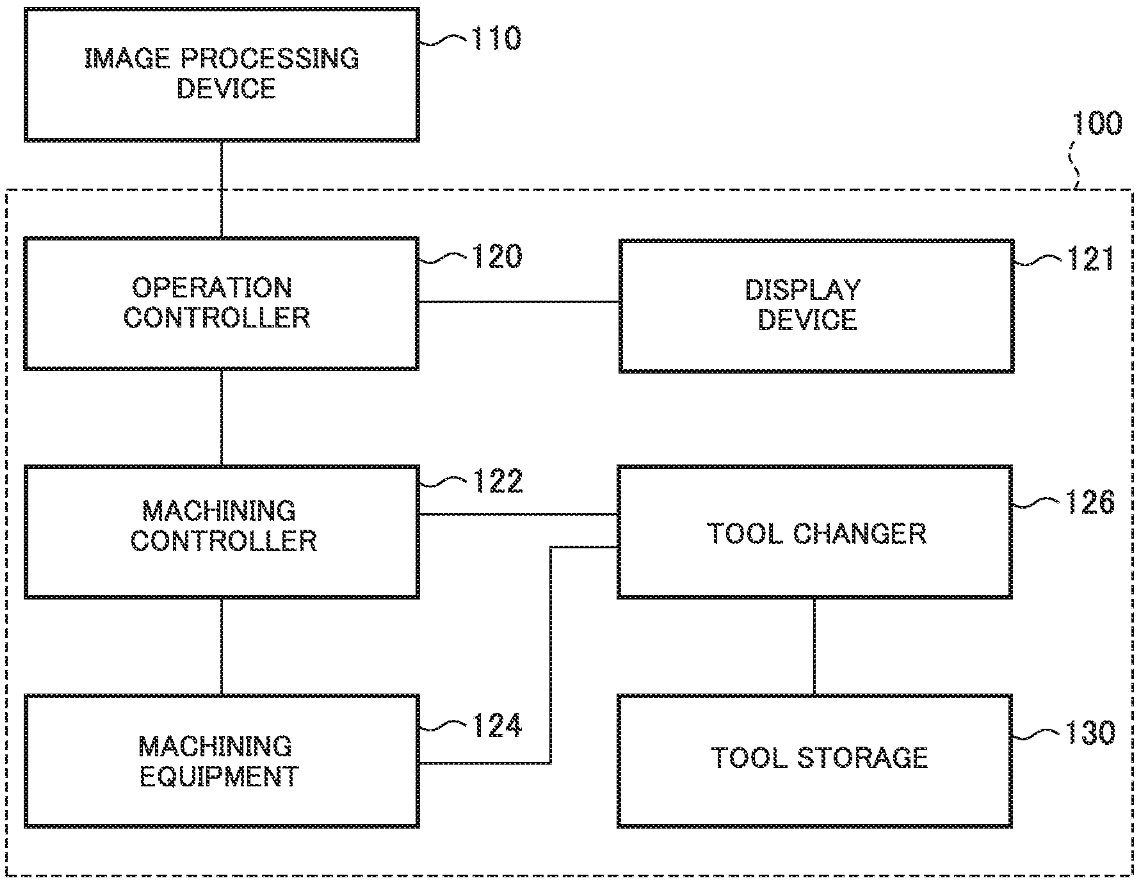
FIG. 8 is a hardware configuration diagram of a machine tool and an image processing device.

FIG. 8 is a hardware configuration diagram of the machine tool 100 and the image processing device 110.

The machine tool 100 includes an operation controller 120, a display device 121, a machining controller 122, the machining equipment 124, a tool changer 126, and the tool storage 130. The machining controller 122 functioning as a numerical controller transmits control signals to the machining equipment 124 in accordance with a machining program. The machining equipment 124 moves the tool spindle 116 to machine a workpiece in accordance with an instruction from the machining controller 122.

The operation controller 120 includes the operation panel 206 and controls the machining controller 122. The display device 121 serves as a display provided on the operation panel 206 and displays various images on its screen. The tool storage 130 stores tools therein. The tool changer 126 corresponds to a so-called ATC (Automatic Tool Changer) and is provided outside the machining area 200 (that is, on the tool storage 130 side of the inner cover 160) (see FIGS. 1 and 3). The tool changer 126 takes out a tool from the tool storage 130 and changes a tool on the tool spindle 116 with the tool thus taken out in accordance with a change instruction from the machining controller 122.

The image processing device 110 mainly performs image processing such as recognition of tool shapes. As described above, the image processing device 110 may be part of the operation controller 120. The image processing device 110 may be a common laptop personal computer (PC) or tablet computer.

Figure 9:
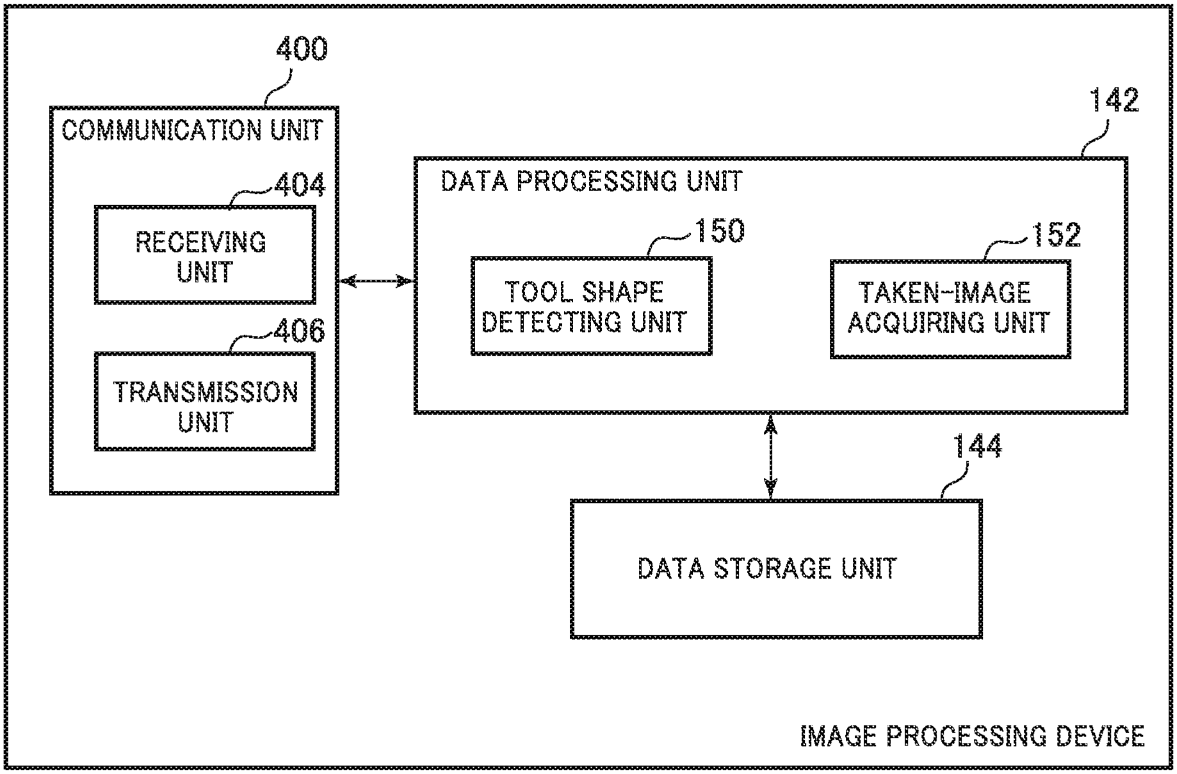
FIG. 9 is a functional block diagram of the image processing device.

FIG. 9 is a functional block diagram of the image processing device 110.

The components of the image processing device 110 are implemented by hardware including computing units such as central processing units (CPUs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks to be described below do not refer to configurations in units of hardware but to blocks in units of functions.

Note that the operation controller 120 and the machining controller 122 may also be implemented by hardware including computing units such as processors, storage devices such as memories and storages, and wired or wireless communication lines that connect these units and devices, and software and programs that are stored in the storage devices and supply processing instructions to the computing units, which are executed on operation systems separate from the image processing device 110.

The image processing device 110 includes a data processing unit 142, a communication unit 400, and a data storage unit 144. The communication unit 400 performs communication with the operation controller 120. The data processing unit 142 performs various types of processing on the basis of data received from the operation controller 120 and data stored in the data storage unit 144. The data processing unit 142 also functions as an interface of the communication unit 400 and the data storage unit 144. The data storage unit 144 stores various programs and set data therein.

The communication unit 400 includes a receiving unit 404 that receives data from the operation controller 120 and a transmission unit 406 that transmits data and commands to the operation controller 120.

The data processing unit 142 includes a tool shape detecting unit 150 and a taken-image acquiring unit 152.

The taken-image acquiring unit 152 controls the camera 106 to take an image of the tool 102. The machining controller 122 causes the tool 102 to be moved to the tool recognition area 210, and the taken-image acquiring unit 152 takes an image of the tool 102. The taken-image acquiring unit 152 can also instruct the direction of moving of the tool spindle 116 (that is, the tool 102) to the machining controller 122. The tool shape detecting unit 150 creates tool shape data on the basis of the taken image of the tool 102, thereby performing tool test and tool registration. In tool test, the image processing device 110 transmits the result of image processing to the operation controller 120 and causes the display device 121 to display the result.

The machine tool 100 has been described above on the basis of the embodiment.

In the present embodiment, while the workpiece spindle 104 (more specifically, a motor that drives and rotates the workpiece spindle 104) serves as a heat source and raises the temperature of the headstock 170 to a relatively high temperature, the camera 106 is fixed to the headstock 170 not via a long arm. That is, there is no member largely deformable by heat between the camera 106 and the headstock 170. Therefore, even when the temperature of the headstock 170 becomes high, the camera 106 can be prevented from being shifted from a set position. Further, the camera 106 cannot be largely displaced by disturbance such as vibration of the workpiece spindle 104. Meanwhile, although the illumination device 108 is supported by the arm 172, there is no substantive problem because it suffices that the illumination device 108 has an illumination function and the illumination device 108 does not require the position accuracy as high as that of the camera 106 with respect to the tool 102.

The present invention is not limited to the embodiment described above and modifications thereof, and any component thereof can be modified or embodied without departing from the scope of the invention. Components described in the embodiment and modifications can be combined as appropriate to form various embodiments. Some components may be omitted from the components presented in the embodiment and modifications.

Camera calibration may be performed in order to correct misalignment between the axis of a tool spindle and the optical axis of a camera, although not described in the above embodiment. Specifically, a calibration plate with a predetermined pattern printed thereon can be used. By obtaining a relative positional relation between this calibration plate and the camera, the misalignment between the axis of the tool spindle and the optical axis of the camera is corrected.

Specifically, the calibration plate is set at a freely-selected position within a tool recognition area. However, it is assumed that the position and orientation of the calibration plate are known. Then, an image of this calibration plate is taken by the camera. The predetermined pattern of the calibration plate appearing in the taken image is extracted, and image analysis is performed on the extracted predetermined pattern. In this image analysis, a camera angle, that is, the direction of the optical axis of the camera is identified on the basis of the degree of deformation of the shape of the predetermined pattern. Since the position of the tool spindle is already known, the relative positional relation between the tool spindle and the camera can be obtained. Thereafter, when the camera is used for actual measurement, the position of the camera and the direction of the optical axis are identified on the basis of the positional relation with the tool spindle at that time, and a measurement value can be corrected considering the posture of the camera at each time.

In the above embodiment, the configuration in which the camera 106 is fixed to be adjacent to the headstock 170 has been described as an example. In a modification of the above embodiment, a predetermined attachment member may be interposed between a camera and a headstock. In this case, the camera is arranged to be closer to the headstock than an illumination device. The camera is arranged below a tool.

Although an example in which the proximal end of the arm 172 is fixed to the housing of the tool storage 130 has been described in the above embodiment, that proximal end may be fixed to an internal structure, such as a support that constitutes the tool storage 130 and the like.

Although an example in which the proximal end of the arm 172 is fixed to the tool storage 130 has been described in the above embodiment, that proximal end may be fixed to the headstock 170. In this case, the illumination device 108 may be displaced from its set position because of deformation of the arm 172 by heat. However, since the illumination device 108 does not require the position accuracy as high as that of the camera 106 as described above, a substantive problem is hardly caused. The camera 106 may be fixed to the proximal end of the arm 172 (that is, near the headstock 170).

In the above embodiment, an example in which the camera 106 is installed with its optical axis L2 inclined with respect to the vertical line L1 has been described. That is, the camera 106 is arranged at a position offset from the position directly below the tool 102. In the modification, the camera 106 may be installed with its optical axis L2 parallel to the vertical line L1. That is, while countermeasures against contamination caused by drop of a coolant are taken, the camera 106 may be arranged directly below the tool 102, and the illumination device 108 may be arranged above the tool 102.

As described in the above embodiment, the camera 106 is fixed to the headstock 170 above the workpiece spindle 104 with the optical axis L2 inclined with respect to the vertical direction. Meanwhile, the illumination device 108 (the illumination unit) is arranged above the camera 106 to face the camera 106. As a result, a straight line connecting the camera 106 and the illumination device 108 to each other (that is, the linear test area 212) is inclined with respect to the vertical direction.

As described above, the optical axis L2 of the camera 106 overlaps the workpiece spindle 104 when viewed in a direction perpendicular to the axis L3 of the workpiece spindle 104 and in the horizontal direction (see FIG. 7). Meanwhile, when viewed in the direction of the axis L3 of the workpiece spindle 104, the optical axis L2 of the camera 106 does not overlap the workpiece spindle 104 (see FIG. 5). The camera 106 is located at a position overlapping the headstock 170 in plan view (that is, when viewed along the vertical line L1).

The tool spindle 116 (the tool holding part) can move in the direction of the axis of the workpiece spindle 104 in a state of holding the tool 102. The camera 106 performs imaging when the tool 102 held by the tool spindle 116 is located at a position crossing the test area 212. With this configuration, the position for imaging the tool 102 can be adjusted by moving the tool spindle 116 in the direction of the axis of the workpiece spindle 104. Consequently, imaging of the tool 102 can be performed with a space above the workpiece spindle 104 effectively used.

CROSS REFERENCE TO RELATED APPLICATIONS

This application is a continuation application of International Application No. PCT/JP2022/020138, filed on May 13, 2022, which claims priority to and the benefit of Japanese Patent Application No. 2021-094983, filed on Jun. 7, 2021. The contents of these applications are incorporated herein by reference in their entirety.

What is claimed is:

1. A machine tool comprising:

a headstock for supporting a workpiece spindle to allow the workpiece spindle to rotate; and a camera for imaging a tool held in a predetermined area, wherein the camera is fixed to the headstock above the workpiece spindle with an optical axis of the camera inclined with respect to a vertical direction.

2. The machine tool according to claim 1, further comprising an illumination unit arranged above the camera to face the camera, wherein the area is formed between the camera and the illumination unit.

3. The machine tool according to claim 2, further comprising an arm to which the illumination unit is fixed, wherein the arm is fixed to a housing of a tool storage unit or an internal structure apart from the headstock.

4. A machine tool comprising:

a headstock for supporting a workpiece spindle to allow the workpiece spindle to rotate;

a camera for imaging a tool held in a predetermined area; and an illumination unit arranged to face the camera, wherein a straight line connecting the camera and the illumination unit to each other is inclined with respect to a vertical direction, a tool holding part is capable of moving in a direction of an axis of the workpiece spindle and holding the tool, wherein the area is formed between the camera and the illumination unit, the camera is arranged to be closer to the headstock than the illumination unit, and the camera performs imaging when the tool held by the tool holding part is located at a position crossing the straight line.

5. The machine tool according to claim 1, wherein a light-receiving surface of the camera faces upward.

* * * * *